(12) United States Patent
Revelis et al.

(10) Patent No.: US 8,381,613 B2
(45) Date of Patent: Feb. 26, 2013

(54) PARKING BRAKE CABLE AND ADJUST SYSTEM HAVING NO LOST CABLE TRAVEL

(75) Inventors: Peter Revelis, Newmarket (CA); Simon Chan, Markham (CA); Mark Van Ryswyck, Concord (CA)

(73) Assignee: Ventra Group, Inc., Concord, Ontario (CA)

( * ) Notice: Subject to any disclaimer, the term of this patent is extended or adjusted under 35 U.S.C. 154(b) by 245 days.

(21) Appl. No.: 12/832,636

(22) Filed: Jul. 8, 2010

(65) Prior Publication Data

US 2012/0006143 A1 Jan. 12, 2012

(51) Int. Cl.
*G05G 1/04* (2006.01)

(52) U.S. Cl. .......................................... 74/523

(58) Field of Classification Search ............... 74/502.2, 74/512, 523
See application file for complete search history.

(56) References Cited

U.S. PATENT DOCUMENTS

| | | | |
|---|---|---|---|
| 4,130,028 A | 12/1978 | Solberg | |
| 4,819,501 A | 4/1989 | Kraus et al. | |
| 5,235,867 A | 8/1993 | Wortmann et al. | |
| 5,709,287 A | 1/1998 | Bochman | |
| 5,816,111 A | 10/1998 | Borchers | |
| 5,950,496 A | 9/1999 | Rampp | |
| 6,023,992 A * | 2/2000 | Cameno | 74/501.5 R |
| 6,282,980 B1 | 9/2001 | Sykes | |
| 6,286,389 B1 | 9/2001 | Papadatos | |
| 6,718,836 B2 | 4/2004 | Revelis et al. | |
| 7,021,174 B2 | 4/2006 | Revelis et al. | |
| 7,146,873 B2 | 12/2006 | Braker et al. | |
| 7,373,856 B2 | 5/2008 | Sykes et al. | |
| 7,475,615 B2 * | 1/2009 | Revelis | 74/523 |
| 7,658,126 B2 | 2/2010 | Revelis et al. | |
| 2002/0174737 A1 | 11/2002 | Revelis et al. | |
| 2003/0000780 A1 | 1/2003 | Revelis et al. | |
| 2004/0074331 A1 | 4/2004 | Sykes et al. | |
| 2005/0211009 A1 | 9/2005 | Revelis et al. | |

FOREIGN PATENT DOCUMENTS

EP 0869888 A1 * 10/1998

* cited by examiner

*Primary Examiner* — Vicky Johnson
(74) *Attorney, Agent, or Firm* — Pillsbury Winthrop Shaw Pittman LLP

(57) ABSTRACT

A self-adjusting parking brake actuator includes a brake lever that is movable between brake-released and brake-applied positions. In addition, the parking brake cable adjust system includes a self-adjustment assembly having a frame; a rack mounted for movement relative to the frame along a longitudinal direction of the rack in a tension direction and an opposite direction; a cable connector for operatively connecting the rack to a brake cable, a first resilient member biasing the rack relative to the frame along its longitudinal direction in the tensioning direction, a primary locking device configured to engage the rack and permit movement of the rack relative to the frame in the tensioning direction only; a secondary locking device moveable between (a) a locking to lock the primary locking device to prevent adjusting movement of the rack relative to the frame in the tensioning direction, and (b) a releasing position to permit the primary locking device to allow adjusting movement of the rack relative to the frame in the tensioning direction by the biasing of the resilient member; and a second resilient member biasing the secondary locking device to the locking position.

14 Claims, 5 Drawing Sheets

PARKING BRAKE CABLE AND ADJUST SYSTEM HAVING NO LOST CABLE TRAVEL

FIELD OF INVENTION

The present invention relates to parking brake actuators.

BACKGROUND

In conventional parking brakes for vehicles, a hand or foot brake lever pivotally mounts to a frame of the vehicle or an intermediary parking brake actuator frame. A sheathed brake cable extends between an arm of the lever and a wheel brake of the vehicle. Pivotal movement of the brake lever from a brake-released position toward a brake-applied position tensions the brake cable, thereby engaging (i.e., activating) the wheel brake.

When a conventional parking brake is initially installed in a vehicle, slack in the brake cable can be removed to minimize the extent to which the brake lever pivots before causing the wheel brakes to engage. Removing or taking up the slack in the brake cable minimizes the wasted stroke length of the lever and maximizes the useful lever stroke that an operator uses to create the braking force.

As a parking brake is repeatedly used, the brake cable tends to stretch and/or its cable sheathing tends to compress. This can create slack in the brake cable system which reduces the useful stroke length of the brake lever. In some circumstances, the stretching of the cable and compression of the sheathing can be so severe that the wheel brake does not securely engage even when an operator moves the brake lever into a fully engaged position.

Various conventional parking brake actuators include self-adjusting mechanisms that automatically take up slack in the brake cable to minimize or eliminate the problems associated with brake cable stretching. These mechanisms use disengagement of the primary locking feature in the release position of the parking brake to allow the cable system to adjust in both directions. This disengagement requires a certain amount of cable travel and/or parking brake lever rotation to reapply the primary to lock the self-adjusting member. As such, lost cable travel occurs.

Some self-adjusting mechanisms may have a one-way locking mechanism, which includes a spring to constantly try to balance the system. However, when the parking brake is being returned from the brake-applied position to the brake-released position, the equalizer of the rear cable system can become stuck or seized. If the equalizer does not move as the parking brake is released, slack can be created by the seized equalizer and will be taken up by the spring force. As a result, the parking brake will be in a brake-released position, but the rear cable system may still be applied.

Other conventional adjusting mechanisms are quite cumbersome to install and adjust. For example, the AL-KO quick adjuster (Part. No. 561711668) includes two racks that are clamped together to provide a two-way lock. However, it requires the original equipment manufacturer (OEM) to install the parking brake, loosen the bolt that clamps the two racks together, makes adjustments, and then retightened the bolt to a predetermined toque to lock.

Thus, an improved parking brake cable adjust system is desired.

BRIEF SUMMARY OF THE INVENTION

Accordingly, one aspect of one or more embodiments of the present invention provides an improved parking brake cable adjust system with no lost cable travel.

Another aspect of one or more embodiments of the present invention provides a parking brake actuator that includes a brake lever movable between brake-released and brake-applied positions, and a self-adjustment assembly. The self-adjustment assembly includes a frame; a rack mounted for movement relative to the frame along a longitudinal direction of the rack in a tension direction and an opposite direction; a cable connector for operatively connecting the rack to a brake cable, a first resilient member biasing the rack relative to the frame along its longitudinal direction in the tensioning direction, a primary locking device configured to engage the rack and permit movement of the rack relative to the frame in the tensioning direction only; a secondary locking device moveable between (a) a locking to lock the primary locking device to prevent adjusting movement of the rack relative to the frame in the tensioning direction, and (b) a releasing position to permit the primary locking device to allow adjusting movement of the rack relative to the frame in the tensioning direction by the biasing of the resilient member; and a second resilient member biasing the secondary locking device to the locking position.

Another aspect of one or more embodiments of the present invention provides a vehicle that is equipped with the above-described parking brake cable adjust system.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF EMBODIMENTS OF THE INVENTION

Figure 1:
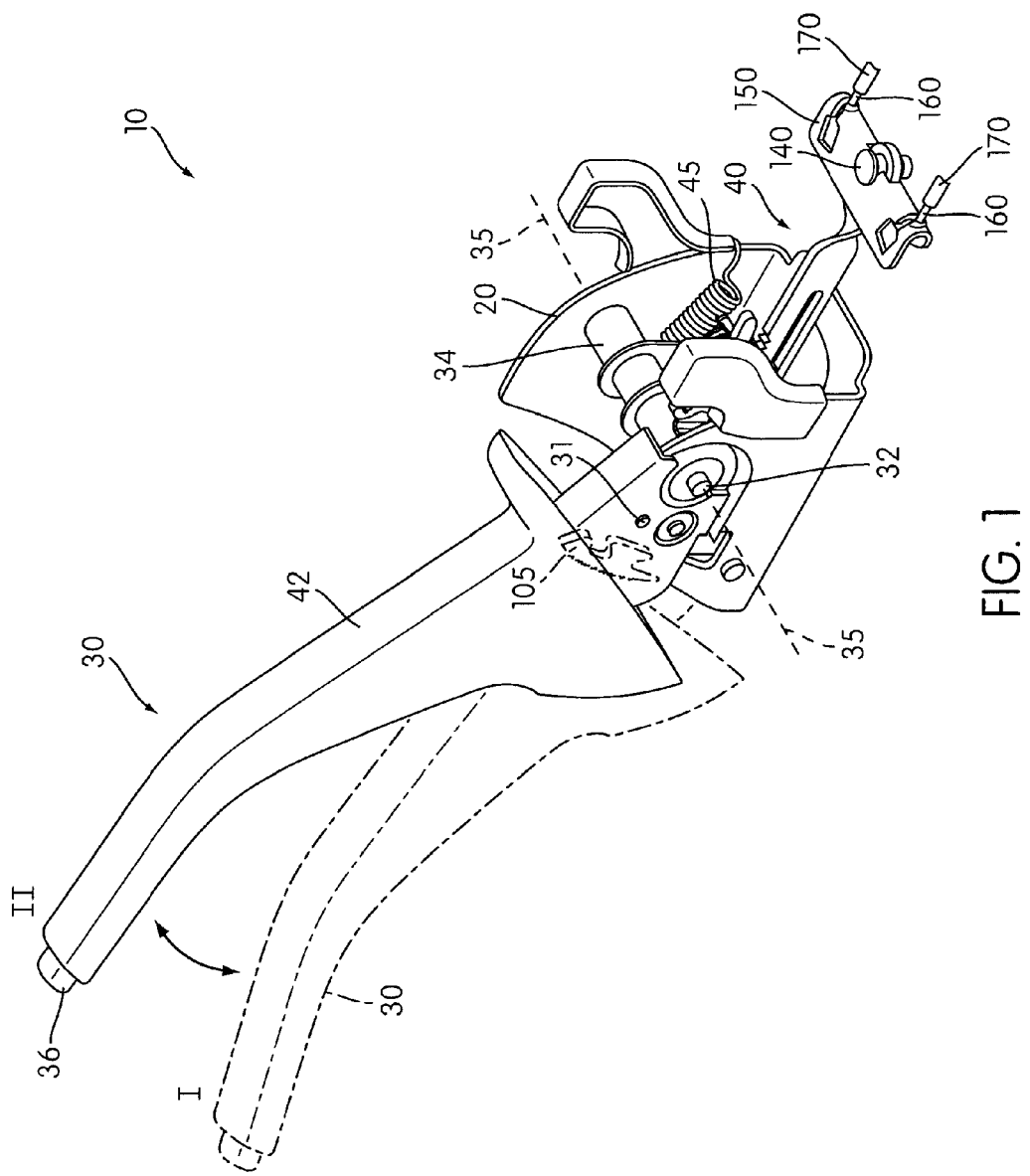
FIG. 1 is a perspective view of a parking brake cable adjust system according to an embodiment of the present invention.

FIG. 1 illustrates a parking brake cable adjust system 10 according to an embodiment of the present invention. The parking brake cable adjust system 10 generally includes a brake lever frame 20, a brake lever 30, and a self-adjustment assembly 40.

Figure 5:
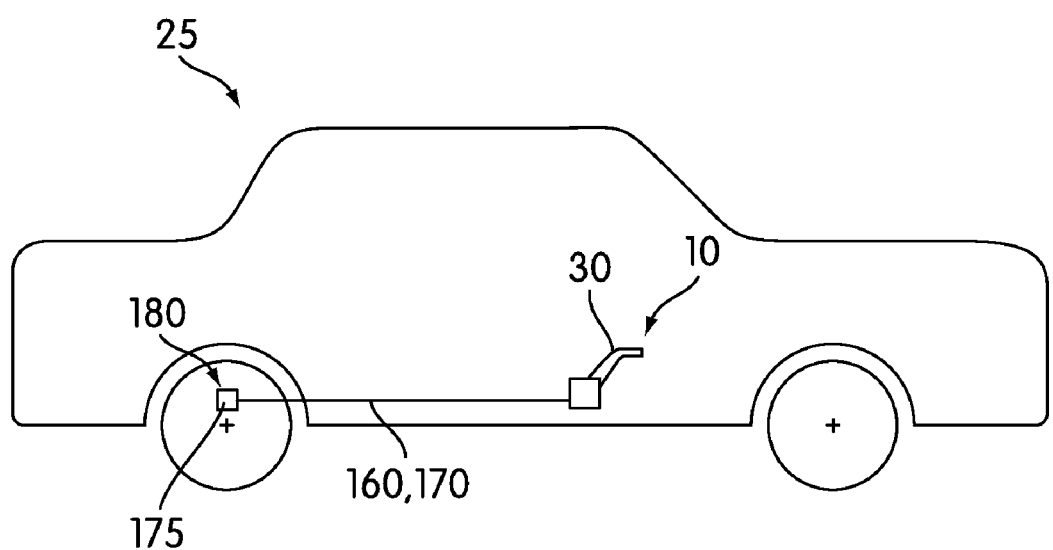
FIG. 5 is a side view of a vehicle with the parking brake cable adjust system according to an embodiment of the present invention incorporated therein.

The brake lever frame 20 serves as a mounting bracket and is constructed to be rigidly mounted to the frame of a wheeled vehicle 25 (FIG. 5). The brake lever frame 20 may be, for example, a "U-shaped" stamping, or welded together from multiple sheets of metal. Alternatively, the brake lever frame 20 may be integrally formed with a frame component of the vehicle 25. While the illustrated vehicle 25 is a passenger car, the vehicle 25 may alternatively comprise any other type of parking-brake-equipped vehicle without deviating from the scope of the present invention (e.g., truck, sport utility vehicle (SUV), all-terrain vehicle (ATV), tractor, heavy machinery, golf cart, etc.).

The brake lever 30 connects to the brake lever frame 20 via a lever pivot rivet 32 and pivot tube 34 for pivotal movement relative to the frame 20 about a pivot axis 35 between a first un-actuated position I (shown in dotted lines in FIG. 1, also referred to as a "brake-released" or "home" position) and a second actuated position II (shown in solid lines in FIG. 1, also referred to as a "brake-applied" position).

A release button 36 and associated locking mechanism 105 facilitate locking (and unlocking) of the lever 30 in the first position, the second position, or a variety of intermediate brake-applied positions, as is conventional. The brake lever 30 may be integrally formed from two parallel pieces of sheet metal that may be secured by rivets 31. A sheath 42 may cover handle portion for aesthetic purposes.

The locking mechanism 105 may utilize any suitable parking brake lever locking mechanism (e.g., those disclosed in U.S. Patent Application Publication Nos. 2002/0174737; 2003/0000780; 2004/0074331; and 2005/0211009, and U.S. Pat. Nos. 6,282,980; 6,286,389; and 6,718,836, the entire disclosures of which are incorporated herein by reference).

While the illustrated brake lever 30 pivotally connects to the frame 20, the brake lever 30 may movably connect to the frame 20 in any other suitable manner (e.g., linear sliding mechanism, 4-bar mechanism, curvilinear track, etc.) without deviating from the scope of the present invention.

The self-adjustment assembly 40 generally includes right and left frame elements 40a, 40b, a toothed rack 50, a primary pawl 60, and a secondary pawl 70, and associated elements as described herein.

Figure 2:
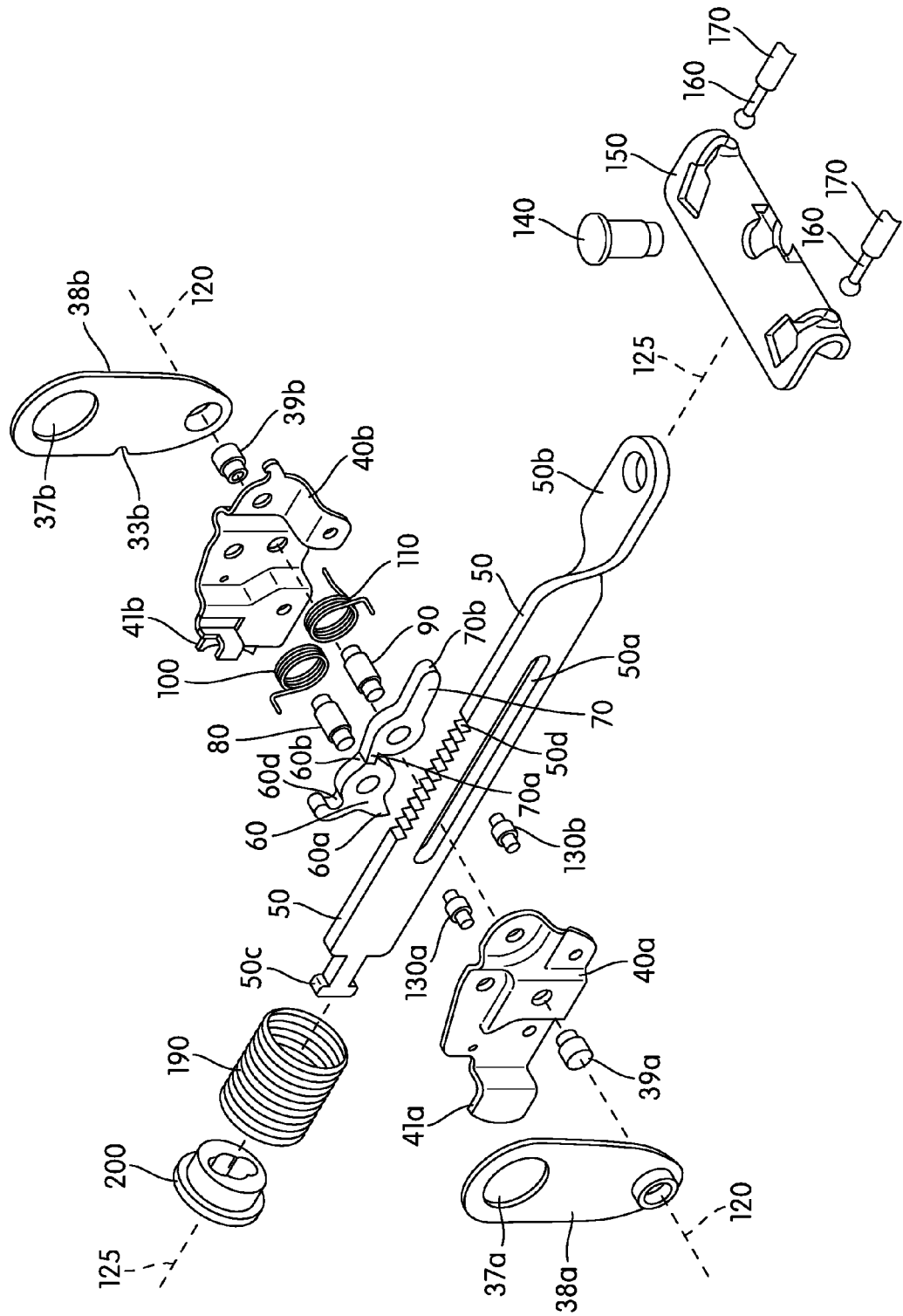
FIG. 2 is an exploded view of the self-adjustment assembly shown in FIG. 1.
Figure 3:
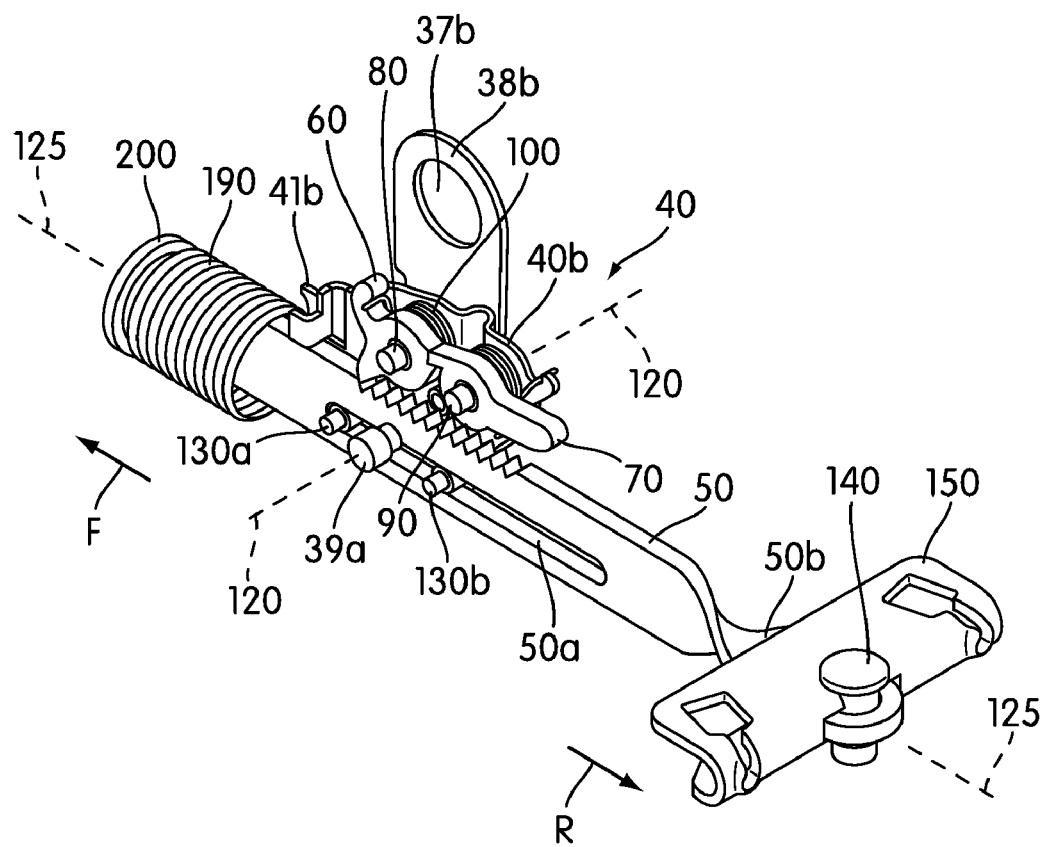
FIG. 3 more clearly shows the assembled self-adjustment assembly shown in FIGS. 1 and 2.

As shown in FIGS. 2 and 3, the self-adjustment assembly 40 connects to the lever arms 38a, 38b via rivets 39a, 39b, respectively, for relative pivotal movement about a self-adjustment assembly pivot axis 120, parallel to and below the pivot axis 35. Movement of the brake lever 30 causes rotation of the lever arms 38a, 38b about the pivot axis 35. Specifically, the arms 38a, 38b have openings 37a, 37b slid over and affixed to the pivot tube 34, for example by welding.

The self-adjustment assembly 40 can move from a first position to a second position when the brake lever 30 moves from the brake-released position I to the brake applied position II. As explained below, movement of the self-adjustment assembly 40 between its first and second positions involves rotation and/or translation relative to the brake lever frame 20. A return spring 45 tends to inhibit movement of the brake lever 30 from the brake-released position I to the brake-applied position II. The return spring 45 may be optional, as tension in the cable system provides resistance also.

FIG. 2 is an exploded view of the self-adjustment assembly 40 shown in FIG. 1.

The rack 50 connects to the self-adjustment assembly 40 for translational movement relative to the self-adjustment assembly 40 along a longitudinal axis 125 of the rack 50. Two guide pins 130a, 130b extend through an elongated longitudinally extending slot 50a in the rack 50 to facilitate the relative translational movement of the rack 50 along the axis 125 to take up slack in the brake cables 160. The slot 50a preferably intersects the self-adjustment assembly pivot axis 120 or is in close proximity to the axis 120 so as to minimize bending forces that might be exerted on the rack 50 when the rack encounters a longitudinally oriented tensile load. A notch 33b, in the lever arm 38b, is configured to receive and act as an anchor point for a terminal end of the return spring 45.

The pivotal connection between the self-adjustment assembly 40 and the brake lever 30 enables the lever arms 38a, 38b to pivot when the lever 30 is rotated such that the longitudinal axis 125 of the rack 50 tends to intersect the location where the sheathing 170 is anchored to the brake lever frame 20 or the frame of the vehicle 25. Consequently, the rack 50 acts as a tensile member between the primary pawl 60 and the brake cables 160 and/or the anchor point of the sheathing 170.

A rearward portion 50b of the rack 50 pivotally connects via a rivet 140 to a cable equalizer 150. The cable equalizer 150 is constructed and arranged to engage one or more brake cables 160 (two shown). Although, it will be appreciated that the equalizer 150 may be replaced by any other suitable connector for operatively connecting the rack 50 to the brake cable(s) 160 without deviating from the scope of the present invention.

A compression adjustment spring 190 extends between one or more bosses or projections 41a, 41b of the self-adjustment frames 40a, 40b and a forward portion 50c of the rack 50 to bias the rack 50 in a forward direction F. This biasing tends to take up any slack in the brake cables 160, as will be discussed in further detail below. The forward portion 50c of the rack 50 extends through the spring 190 and mounts to the spring 190 via an end cap 200. One end of the compression spring 190 engages the shoulder of the cap 200 while the other end engages bosses 41a, 41b to urge the cap 200 and the rack 50 forwardly relative to frames 40a, 40b. As shown, the cap 200 connects to the forward portion 50c of the rack 50 by a bayonet connection. However, it will be appreciated that the cap 200 may connect to the rack 50 by other mechanisms, such as, for example, external fasteners, threaded engagement, welds, etc. And, in some implementations, the compression spring 190 may be replaced with another resilient member, such as, for example, a torsion or tension spring.

The rack 50 includes a plurality of rack teeth 50d that are equally spaced apart from each other along the longitudinal axis 125 on the top surface of the rack 50. The rack teeth 50d are configured to continuously mesh with a toothed projection 60a of a primary pawl 60. The primary pawl 60 rotatably connects via pinion 80 to the self-adjustment frame 40 such that longitudinal movement of the rack 50 in the forward direction F causes the primary pawl 60 to rotate.

The primary pawl 60 is configured to allow the relative moment of the rack 50 in the forward direction F by ratcheting of the primary pawl 60 along teeth 50d, for example, tooth-by-tooth. The toothed projection 60a on the primary pawl 60, the teeth 50d on the rack 50, or both, may be configured to permit ratcheting of the primary pawl 60 in one direction only, i.e., the forward direction F. For instance, the rack teeth 50d may be angled slightly rearward to provide the one-way ratcheting function.

When the primary pawl 60 is unlocked from the rack 50 (as further discussed below) and the rack 50 moves in the forward direction F, one or more teeth 50d push against the tooth projection 60a urging the primary pawl 60 to rotate forward slightly. This permits the toothed projection 60a to briefly disengage from rack teeth 50d such that the rack 50 can move relative to the primary pawl 60 in the forward direction F. A torsion spring 100 engages a notch 60d on the primary pawl 60 and the self-adjustment frame 40 that resists the rotation of the primary pawl 60 and keeps the toothed projections 60a of the primary pawl 60 generally in contact with the teeth 50d of the rack 50.

Conversely, rearward movement of the rack 50 is generally prevented because the toothed projection 60a becomes wedged against one or more rearwardly-angled teeth 50d, thereby binding the primary pawl 60. Thus, primary pawl 60 effectively prevents the rack 50 from moving in a rearward direction R with respect to the primary pawl 60.

The secondary pawl 70 is operatively arranged in-line with, and engages the primary pawl 60 so as to lock the primary pawl 60 with the rack 50 and prevent relative movement there between. The secondary pawl 70 rotatably connects via pinion 90 to the self-adjustment assembly 40, and includes a projection 70a which can engage a corresponding recessed portion 60b of the primary pawl 60 in an engaged position that locks the position of the primary pawl 60 with respect to the rack 50. The secondary pawl 70 also has a disengaged position that allows the primary pawl 60 to rotate relative to the rack 50, thereby allowing the rack 50 to move in the forward direction F relative to the self-adjustment system 40. A torsion spring 110 engages a bottom surface of the secondary pawl 70 and the self-adjustment frame 40 that tends to urge and keep the projection 70a of the secondary pawl 70 in locking engagement with the recessed portion 60b of the primary pawl 60.

When the second pawl 70 engages the primary pawl 60, the continuously meshing teeth 50d and toothed projection 60a will not slip or allow any tooth skip relative to each other, as is possible in conventional self-adjusting brake actuators that utilize teeth that engage and disengage from each other to connect and disconnect a brake lever from a brake cable 160. That is, the secondary pawl 70 engages the primary pawl 60 to prevent its movement and keep the projection 60a engaged with the rack teeth 50d, thus preventing movement of the rack 50 relative to the system 40 and lever 30. The parking brake cable adjust system 10 therefore provides more reliable operation than conventional self-adjusting brake actuators, as will be described in further detail below.

While the primary pawl 60 illustrated functions as a locking device configured to engage the rack teeth 50d and permit movement of the rack relative 50 to the frames 40a, 40b in the tensioning direction only, in some implementations, the primary pawl 60 could be replaced with another one-way locking mechanism, such as, for example, a gear and pinion hub secured by a torsion clutch spring (e.g., as described in U.S. Pat. No. 7,475,615, the entire disclosure of which is incorporated herein by reference).

Moreover, while the secondary pawl 70 illustrated functions as a locking device moveable between the engaged position, and the disengaged position, the secondary pawl 70 could be replaced by another locking feature, such as, for example, a latch, a gear, a cam, locking pins, pawl tabs, a torsion lock or the like that are configured to maintain the primary pawl 60 into locking engagement with the rack 50. This locking engagement may be in a direction generally perpendicular to the direction of travel of the primary pawl 60. In some implementations, the secondary pawl 70 may be configured to lock the primary pawl 60 to prevent adjusting movement of the rack 50 relative to the frame in both the tensioning direction and the opposite direction.

FIG. 3 more clearly shows the assembled self-adjustment assembly 40 shown in FIGS. 1 and 2. For clarity, the left lever arm 38a and the left frame element 40a have been omitted from the figure.

Hereinafter, operation of parking brake cable adjust system 10 is described. To actuate the parking brake cable adjust system 10, an operator presses the release button 36, which disengages the locking mechanism 105. The operator is able to move the lever 30 from the brake-released position I toward the brake-applied position II. In some implementations, pressing the release button 36 may be optional, as the locking mechanism 105 may include a one-way ratchet mechanism configured to permit movement in the brake applying direction. Movement of the brake lever 30 towards the brake-applied position II causes the lever arms 38a, 38b to pivot about the pivot axis 35 of the lever 30. This in turn, urges the frames 40a, 40b of the self-adjustment assembly 40 to move forward beneath the pivot tube 34. And, since the primary pawl 60 is locked with respect to the rack 50 due to it being one-way ratchet (and thus movement between the rack and the lever in the opposite direction is precluded), the rack 50 is moved in the forward direction F as well. Forward movement of the rack 50 pulls on and tensions the cables 160, which engages the wheel brake 175.

When the brake is applied at the desired tension, the locking mechanism 105 re-engages to lock the brake lever 30 in the desired brake-applied position II.

To release the parking brake lever 30, the operator presses the release button 36 which disengages the locking mechanism 105 and enables the operator to return the brake lever 30 to the brake-released position I, thereby releasing tension on cables 160 and disengaging the wheel brake 175. The secondary pawl 70 remains engaged with the primary pawl 60 while the brake lever 30 is moved from the brake-applied position II to the brake-released position I. The brake lever 30 remains continuously connected to the brake cables 160 via the continuously meshing teeth 50d of the rack 50 and the toothed projection 60a of the primary pawl 60. And, because the secondary pawl 70 remains locked with the primary pawl 60, the primary pawl 60 will not disengage from, nor move relative to, the rack 50.

Figure 4A:
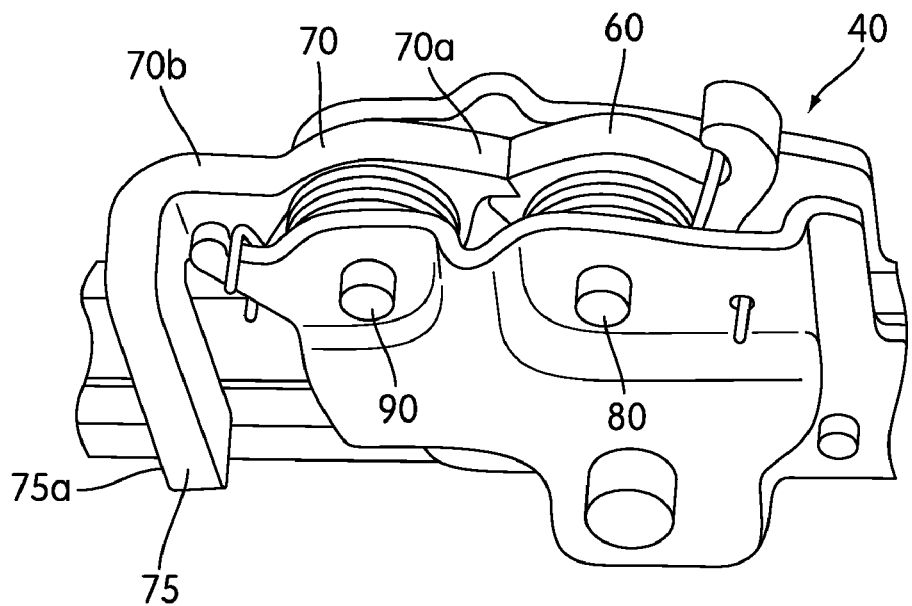
FIGS. 4A-4B show disengaging the secondary pawl from the primary pawl of the self-adjustment assembly according to an embodiment of the present invention.
Figure 4B:
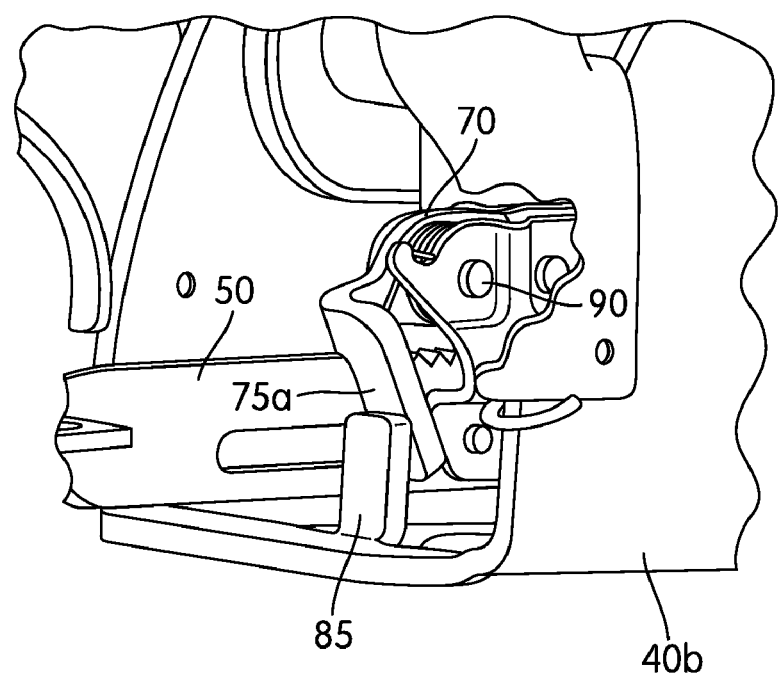

FIGS. 4A-4B show disengaging the secondary pawl 70 from the primary pawl 60 in accordance with an embodiment of the present invention. FIG. 4A shows a top view of the self-adjustment assembly 40 in which the lever portion 70b of secondary pawl 70 may include a downwardly projecting extension 75. For clarity, the frames 40a, 40b have been removed from the figure.

A tab or other projection may be provided on the brake lever frame 20 (or elsewhere), which a back surface 75a of the extension 75 contacts. When a force is applied to the back surface 75a of the extension 75 via the tab, the force will create a moment via the lever portion 70b to disengage the secondary pawl 70 and free the primary pawl 60.

FIG. 4B shows a left side view of the self-adjustment assembly 40 in which the back surface 75a of the extension 75 contacts a tab 85 provided on the brake lever frame 20. This occurs when the parking brake is in the brake-released position I (FIG. 1). The spring 45 may help urge the extension 75 and the tab together 85. As shown, the tab 85 may be a stamped projection in the bottom portion of the frame 20. However, it will be appreciated that the tab 85 may also be welded, fastened (e.g., with screws or rivets), or otherwise provided.

Contact of the extension 75 with the tab 85 in the brake-released position I creates a (counter-clockwise in FIG. 4B) moment of the secondary pawl 70 about the guide pin 90 which overcomes the force applied by the torsion spring 110 and disengages the projection 70a of the secondary pawl 70 from the recessed portion 60b of the primary pawl 60. With the secondary pawl 70 disengaged, the primary pawl 60 selectively permits the rack 50 to move relative to the brake lever 30 in the forward direction F only to take up slack in the cables 160. The primary pawl 60 is thus free to rotate as the rack 50 is moved forward by the tensioning force applied by the compression spring 190 to take up cable 160 slack as needed.

When the brake lever 30 is later rotated from the brake-released position I to the brake-applied position II to actuate the wheel brake 175, the self-adjustment system 40 will move forward and the extension 75 of the second pawl 70 will no longer be in contact with the tab 85. The torsion spring 110 attached to second pawl 70 will cause the secondary pawl 70 to rotate (clockwise) about the guide pins 130b to urge the projection 70a of the secondary pawl 70 to wedge into locking engagement with the primary pawl 60 once again.

Alternatively or additionally, the secondary pawl 70 may be disengaged using a tool (not shown), and/or perhaps even by a person's finger, to unlock the primary pawl 60. For instance, pressing the projection 70a downward will cause the secondary pawl 70 to rotate (counter-clockwise) and to free the primary pawl 60. This approach may be beneficial, for instance, for "quick-adjust" applications where the adjustment is triggered manually rather than automatically (as discussed above with regard to FIGS. 4A-4B).

The tool may be conventional (such as an angled screwdriver, pliers, or another tool with a hooked end), or it may be specifically configured to mate with a feature on the secondary pawl 70, such as, for example, the lever portion 70b and/or the extension 75 (if present). This engagement option may be performed by a vehicle manufacturer, dealer, mechanic, and/or other vehicle service provider. For instance, the secondary pawl 70 may be disengaged from the primary pawl 60 wherever slack in the brake cables 160 is needed to be removed. This may occur during vehicle manufacture, during routine service, maintenance, repairs, and/or at other times when desired.

When the (downward) disengagement force on the lever portion 70b is removed, the torsion spring 110 will cause the secondary pawl 70 to rotate (clockwise in FIG. 4B) about the guide pin 90 which urges the projection 70a of the secondary pawl 70 to wedge into locking engagement with the primary pawl 60 once again.

FIG. 5 further shows the brake cables 160 extending through brake cable sheathing 170 to cable-actuated parking brakes 175 to brake wheels 180 of the vehicle 25. An actuator end of the sheathing 170 may be anchored to a frame of the vehicle 25 or the brake lever frame 20.

While the illustrated rack 50 is constructed and arranged to connect to plural brake cables 160 via the equalizer 150, the rack 50 may alternatively be constructed and arranged to connect to a single brake cable 160 without deviating from the scope of the present invention.

The self-adjustment assembly 40 can be installed into the vehicle 25 with the compression spring 190 in a compressed position. The rack 50 may be locked by the primary pawl 60 and the primary pawl 60 locked by the secondary pawl 70. The secondary pawl 70 may be disengaged from the primary pawl 60 by downward motion on the lever element 70b of the back end of the secondary pawl 70. Once released, the primary pawl 60 still prevents relative rearward motion of the rack 50 but now allows the rack 50 to move forward with respect to the primary pawl 60 only. When the system is balanced (i.e., the compression spring force on rack equals the rear cable system force on rack), the secondary pawl 70 re-engages via the torsion spring 110 attached to the secondary pawl 70 so as to lock further movement of the primary pawl 60 with respect to the rack 50.

While the illustrated parking brake cable adjust system 10 shown comprises a hand-operated parking brake lever 30 that is mounted to the vehicle 25 for actuation by an operator's hand, the brake lever 30 may alternatively be designed and positioned within the vehicle 25 for foot operation without deviating from the scope of the present invention. In addition, the self-adjustment assembly 40 may be configured for both left- and right-seated drivers.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A parking brake actuator comprising:
   a brake lever movable between a brake-released positioned and a brake-applied position; and
   a self-adjustment assembly comprising:
      a frame;
      a rack mounted for movement relative to the frame along a longitudinal direction of the rack in a tension direction and an opposite direction;
      a cable connector for operatively connecting the rack to a brake cable,
      a first resilient member biasing the rack relative to the frame along its longitudinal direction in the tensioning direction,
      a primary locking device in continuous engagement with the rack to prevent adjusting movement of the rack relative to the frame in the opposite direction and to permit the adjusting movement of the rack relative to the frame in the tensioning direction only;
      a secondary locking device moveable between (a) a locking position to lock the primary locking device to prevent the adjusting movement of the rack relative to the frame in the tensioning direction in addition to preventing the adjusting movement of the rack in the opposite direction, and (b) a releasing position to permit the primary locking device to allow the adjusting movement of the rack relative to the frame in the tensioning direction by the biasing of the resilient member while also preventing the adjusting movement of the rack in the opposite direction; and
      a second resilient member biasing the secondary locking device to the locking position.

2. The parking brake actuator according to claim 1, where the rack comprises a plurality of rack teeth, and the primary locking device is configured to engage one or more of the rack teeth in a ratcheting manner and permit movement of the rack relative to the frame in the tensioning direction only.

3. The parking brake actuator according to claim 1, wherein the secondary locking device includes a toothed projection which is configured to engage a recessed portion of the primary locking device.

4. The parking brake actuator according to claim 1, wherein:
   the brake lever connects to the brake lever frame for movement relative to the brake lever frame between the brake-released and brake-applied positions.

5. The parking brake actuator according to claim 1, wherein the secondary locking device is configured to be moved into the releasing position using a tool.

6. The parking brake actuator according to claim 1, wherein the secondary locking device is configured to be moved into the releasing position using a finger of an operator.

7. The parking brake actuator according to claim 1, further comprising a projecting tab,
   wherein the secondary locking device is moved into the releasing position by contacting the projecting tab when the brake lever is in the brake-released position.

8. The parking brake actuator according to claim 7, wherein the secondary locking device moves into the locking position when the secondary locking device is moved away from the tab by the second resilient member.

9. The parking brake actuator according to claim 1, wherein the first locking device is a ratcheting pawl.

10. The parking brake actuator according to claim 1, wherein the second locking device is one of: a pawl or a latch.

11. The parking brake actuator according to claim 1, wherein the second resilient member is one of: a compression, torsion or tension spring.

12. The parking brake actuator according to claim 1, wherein the self-adjustment assembly connects to the brake lever by at least one lever arm mounted on an axis and the self-adjustment assembly is configured for pivotal movement about the axis relative to the brake lever.

13. The parking brake actuator according to claim 1, wherein the brake lever is configured as a hand brake.

14. A combination comprising:
a vehicle with a plurality of wheels;
a wheel brake operatively connected to at least one of the wheels;
a brake cable operatively connected to the wheel brake; and
a parking brake actuator supported by the vehicle, the actuator comprising:
a brake lever movable between a brake-released positioned and a brake-applied position; and
a self-adjustment assembly comprising:
a frame;
a rack mounted for movement relative to the frame along a longitudinal direction of the rack in a tension direction and an opposite direction;
a cable connector for operatively connecting the rack to a brake cable,
a first resilient member biasing the rack relative to the frame along its longitudinal direction in the tensioning direction,
a primary locking device in continuous engagement with the rack to prevent adjusting movement of the rack relative to the frame in the opposite direction and to permit the adjusting movement of the rack relative to the frame in the tensioning direction only;
a secondary locking device moveable between (a) a locking position to lock the primary locking device to prevent the adjusting movement of the rack relative to the frame in both the tensioning direction and the opposite direction, and (b) a releasing position to permit the primary locking device to allow the adjusting movement of the rack relative to the frame in the tensioning direction by the biasing of the resilient member while also preventing the adjusting movement of the rack in the opposite direction; and
a second resilient member biasing the secondary locking device to the locking position.

* * * * *